United States Patent [19]
Pan et al.

[11] Patent Number: 5,492,313
[45] Date of Patent: Feb. 20, 1996

[54] TANGENTIAL LINEAR FLEXURE BEARING

[75] Inventors: Robert B. Pan, Torrance; Alfred L. Johnson, Jr., Manhattan Beach; Tse E. Wong, Seal Beach, all of Calif.

[73] Assignee: The Aerospace Corporation, El Segundo, Calif.

[21] Appl. No.: 261,782

[22] Filed: Jun. 20, 1994

[51] Int. Cl.[6] .............................. G01V 1/16; F16F 1/34; H04R 9/00; F25B 9/14
[52] U.S. Cl. .................................. 267/161; 62/6; 60/520
[58] Field of Search .................................. 267/160, 161, 267/162, 158; 62/6; 60/520

[56] References Cited

U.S. PATENT DOCUMENTS

| | | | |
|---|---|---|---|
| 4,323,994 | 4/1982 | Coogler | 267/161 X |
| 4,458,344 | 7/1984 | Coogler | 267/161 X |
| 4,623,991 | 11/1986 | Vitringa | 267/161 X |
| 4,924,675 | 5/1990 | Higham et al. | 62/6 |
| 5,040,372 | 8/1991 | Higham | 62/6 |
| 5,351,490 | 10/1994 | Ohishi et al. | 62/6 |

FOREIGN PATENT DOCUMENTS 1418533  8/1988  U.S.S.R. .................................. 267/160

OTHER PUBLICATIONS

Marquardt, E., Radebaugh, R., Kittel, P. "Design Equations and Scaling Laws For Linear Compressors With Flexure Springs" Apr. 1993, pp. 796–800.
"Novel Linear Flexure Bearing" T. E. Wong, R. B. Pan, A. L. Johnson 7th Int's Cryocooler Conference, Nov. 17–19, 1992.
"Desing Equations and Scaling Laws for Linear Compressors with Flexure Springs", Eric Marquardt, Ray Radebaugh, Peter Kittel 7th International Cryocooler Conference, Nov. 17–19, 1992 pp. 783–804.
"U.S. Industry Close to Producing Long–Life Space Cooling System", Breck W. Henderson, *Aviation Week and Space Technology*. Apr. 6, 1992.
"Spacecraft Borne Long Life Cryogenic Refrigeration Status and Trends" A. L. Johnson, Cryogenics Jul. 1983, pp. 339–347.
"Remote Sounding of Atmospheric Temperature For Satellites V. The Pressure Modulatio Radiometer For Nimbus F", P. D. Curtis, J. T. Houghton, F. R. S., G. D. Peskett, and C. D. Rodgers Proc. R. Soc. London A. 337, pp. 135–150, 1974.
"The Oxford University Miniature Cryogenic Refrigerator", C. Davey, Conference on Advanced Infrared Detectors & Systems, London p. 39, 1981.
"A Stirling Engine With Hydraulic Power Outpur for Powering Artificial Hearts", R. P. Johnston et al, paper 75212 IECEC Record, 1975.

*Primary Examiner*—Josie Ballato
*Attorney, Agent, or Firm*—William J. Burke; Derrick M. Reid

[57] ABSTRACT

An improved tangential linear flexure bearing for reciprocating machines is disclosed having improved reliability for long life, the flexure bearing being an integrated device comprising a translating cut diaphragm with circumferential tangent cantilever flexure blades secured between rim and hub spacers, the improvement being within the flexure blades having symmetrical opposing end angles and ends equally displaced from radial lines extending from the center of the diaphragm, and having grain orientation extending along the length of the flexure blades both features providing improved radial stiffness, low axial stiffness, reduced flexure stresses and increased fatigue strength for improve reliability.

12 Claims, 4 Drawing Sheets

TANGENTIAL LINEAR FLEXURE BEARING

STATEMENT OF GOVERNMENT INTEREST

The invention was made with Government support under Contract No. F04701-88-C-0089 awarded by the Department of the Air Force. The Government has certain rights in the invention.

FIELD OF THE INVENTION

The present invention relates generally to linear reciprocating mechanisms and more particularly to the bearing support of such mechanisms which are enhanced by frictionless, non-wearing operation and the maintenance of close concentricity between the stationary and moving members. The specific immediate application of this invention is for cryocoolers.

BACKGROUND OF THE INVENTION

Long-life, high-reliability, space-qualified cryocoolers are a major enabling technology for infrared sensor systems on satellites. A linear drive, non-contacting bearing Stirling cycle cryocooler concept is the best approach. (Johnson, A. L., "Spacecraft Borne Long Life Cryogenic Refrigeration Status and Trends", Cryogenics, pp. 339–347, July 1983, and, Henderson, B. W., "U.S. Industry Close to Producing Long Life Space Cooling System", Aviation Week & Space Technology, 6 Apr. 1992). The flexure bearings provide the frictionless and non-wearing support for the reciprocating components of the cryocooler. The high radial stiffness of these bearings allows the use of non-contacting gas gap clearance seals. These bearings were first applied to cryocoolers by Oxford University with spiral-cut diaphragms (Davey, C., "The Oxford University Miniature Cryogenic Refrigerator", International Conference on Advanced Infrared Detectors and Systems, London, pp. 39, 1981). The use of these bearings in an artificial heart application has been disclosed, (Johnston, R. P., et. al., "A Stirling Engine With Hydraulic Power Output For Powering Artificial Hearts", Paper 75212, IECEC Record 1975). Another use of this bearing is in an ultraviolet sensor shutter system, (Curtis, P. D., et al., "Remote Sounding of Atmospheric Temperature From Satellites and V—The Pressure Modulator Radiometer for Nimbus F" , Proc. R. Soc. London, A 337, pp. 135–150, 1974).

Although the above bearings have provided one approach to the reciprocating machines such as the cryocooler, a need exists for a high radial to axial stiffness ratio, low operating stress, long life, high reliability, and space-qualified flexure bearing. Spiral flexure spring response characteristics have been investigated as a suitable means. In general, the spiral flexure bearing assembly consists of a stack of axially flexible cut spiral diaphragms deposed between inner and outer hub spacers and rim spacers which are fastened to a compressor housing which provides support to the flexure spiral diaphragm. An ideal flexure bearing should have the characteristics of a very large radial or in-plane stiffness, minimal axial or out-of-plane stiffness, and minimal stresses when deflected. The radial stiffness is needed in the reciprocating machine to maintain the extremely tight clearance between the piston and the cylinder such as in a compressor to form a gas clearance seal. The axial stiffness needs to be kept as low as possible to avoid affecting the natural frequency of the spring mass system composed of the piston and compressible gas. Low stresses in the cut diaphragm are particularly required to assure that the bearing will not fail due to fatigue stress. Finite element analysis of the spiral-cut diaphragm flexure indicated that highly concentrated stresses occurred at very small regions in the spiral legs near the rim and the hub. These stresses are caused by a combination of bending, tensile, and in particular, undesirable torsional warping. To assure a long life and high fatigue reliability of the flexure bearing over 10,000,000,000 cycles, the magnitude of these undesirable stresses has to be minimized.

One of the possible approaches would be to more effectively utilize the flexure material and distribute the high stresses over a large region of the flexure. Another approach would be to eliminate the geometric stress concentration by pushing the peak stress away from the spiral leg hub and rim. The third approach is to minimize the flexure stress by reducing the undesirable torsional warping of the spiral-cut diaphragm flexure during operation.

A superior solution is a tangential linear flexure bearing design utilizing a translating spider diaphragm having three circumferential tangential cantilever flexure blades. These cantilever flexure blades are sandwiched, riveted, brazed or otherwise restrained between the hub and rim spacers. The flexure support points, of the tangential cantilever blades are defined by the shape of the hub and rim spacers. This flexure design reduces all of the shortfalls identified in the spiral-cut flexures.

Under small axial deflections, the tangential cantilever flexure blades behave like a simple beam under pure bending. Under large axial deflection, as in the case of cryocooler applications, the amount of undesirable warping of the flexure blades is significantly reduced when compared to that of an equivalent spiral cut flexure. Therefore, the deflected flexure blades tend to stress primarily in bending. The combined stress is well behaved and almost uniformly distributed across the width of the flexure blade at full stroke. Peak stresses also tend to be widely distributed and significantly less concentrated than those of the spiral-cut diaphragm. The radial to axial stiffness ratio exceeds 1000.

Stress analysis results for an unimproved tangential linear flexure bearing design has been documented, (Wong, T. E., et. al., "Novel Linear Flexure Bearing" presentation at the 7th International Cryocooler Conference on Nov. 18, 1992, and at the ASME 16th Energy-sources Technology Conference & Exhibition on Feb. 1, 1993). The previously disclosed tangential linear flexure bearing has trapezoidal off set flexures with bonds at the ends joining the hub and rim. The offset of the tangential flexure blades relative to a line extending radially from the center of the diaphragm creates increased maximum shear stress points along length of the flexures. The flexure blades also have apparent random grain orientations along the flexure blades further increasing maximum allowable stress along the length of the flexures. It has been discovered by the inventors of the present invention that perpendicular flexure bonds at the rim and hub attachment points do not distribute stress as evenly along the length of the flexure blades and random grain orientations limits the allowable stress. These and other disadvantages are reduced using an improved tangential linear flexure bearing design according to the teachings of the present invention.

SUMMARY OF THE INVENTION

An object of the present invention is to improve the reliability of tangential linear flexure bearings.

Another object of the present invention is to reduce the stress upon tangential linear flexure bearings.

Yet another object of the present invention is to provide an improved tangential linear flexure bearing design utilizing a translating spider attached to circumferential tangential cantilever flexure blades defined by opposing ends having respective opposing angles from radial lines extending from the center of the bearing to further improve flexure reliability by more evenly distributing stress on the flexure blades.

Still another object of the present invention is the utilization of aligned grain orientations running the length of the tangential flexure blades to further distribute stress on the flexure blades to improve flexure reliability.

The present invention is an improved tangential linear flexure design utilizing a translating spider incorporating circumferential tangential cantilever flexure blades. These tangential cantilever flexure blades are secured by rivets, brazing or bonding rim and hub spacers. The flexure securing points are positioned on the rim and hub spacers and are aligned to corresponding points on the spider diaphragm. The improved design not only reduces the shortfalls of the spiral-cut flexures, but also has improved reliability over the prior art tangential linear flexure bearing designs. Under small axial deflections, the tangential cantilever flexure blades behave like a simple beam under pure bending. Under large axial deflection, as in the case of cryocooler applications, the amount of undesirable warping of the flexure blades is significantly reduced. Therefore, the deflected flexure blades tend to stress primarily in bending. The combined stress is well behaved and almost uniformly distributed across the width of the flexure blade at full stroke.

The improved design particularly reduces peak stresses within the flexure blades tending to widely distribute and significantly reduce concentrated stresses compared to those of the spiral-cut diaphragm and the prior art tangential linear flexure bearing design.

According to one aspect of the present invention, the improved tangential linear flexure bearings have a spider with disposed tangential flexures blades each having respective distal and proximal ends defining opposing end angles which are equal and opposite to each other. The opposing end angles being defined by the rim and hub spacers. The opposing flexure angles function to more evenly distribute the stress upon the flexure blades over the length and width of the flexure blade to improve reliability.

According to another aspect of the present invention, the improved tangential linear flexure bearings have a three leg flexure diaphragms which is manufactured as three identical flexure components each having a respective tangential flexure blade. Rim and hub spacers are integrally attached to the flexure components and secure together the three flexure components to form a complete flexure diaphragm and flexure bearing. The use of three separate flexure components enables the individual manufacture of each of the three separate flexure components, so that the grain orientation of each flexure blade of each respective flexure component extends along the length of the flexure blades. The grain orientation along the length of the flexure blades also more evenly distribute the stress upon the flexure blades over the length of the flexure blades to further improve reliability of the flexure bearing. These and other advantages will become more apparent from the following detailed description of the preferred embodiment.

DETAILED DESCRIPTION OF THE PREFERRED EMBODIMENT

Figure 1:
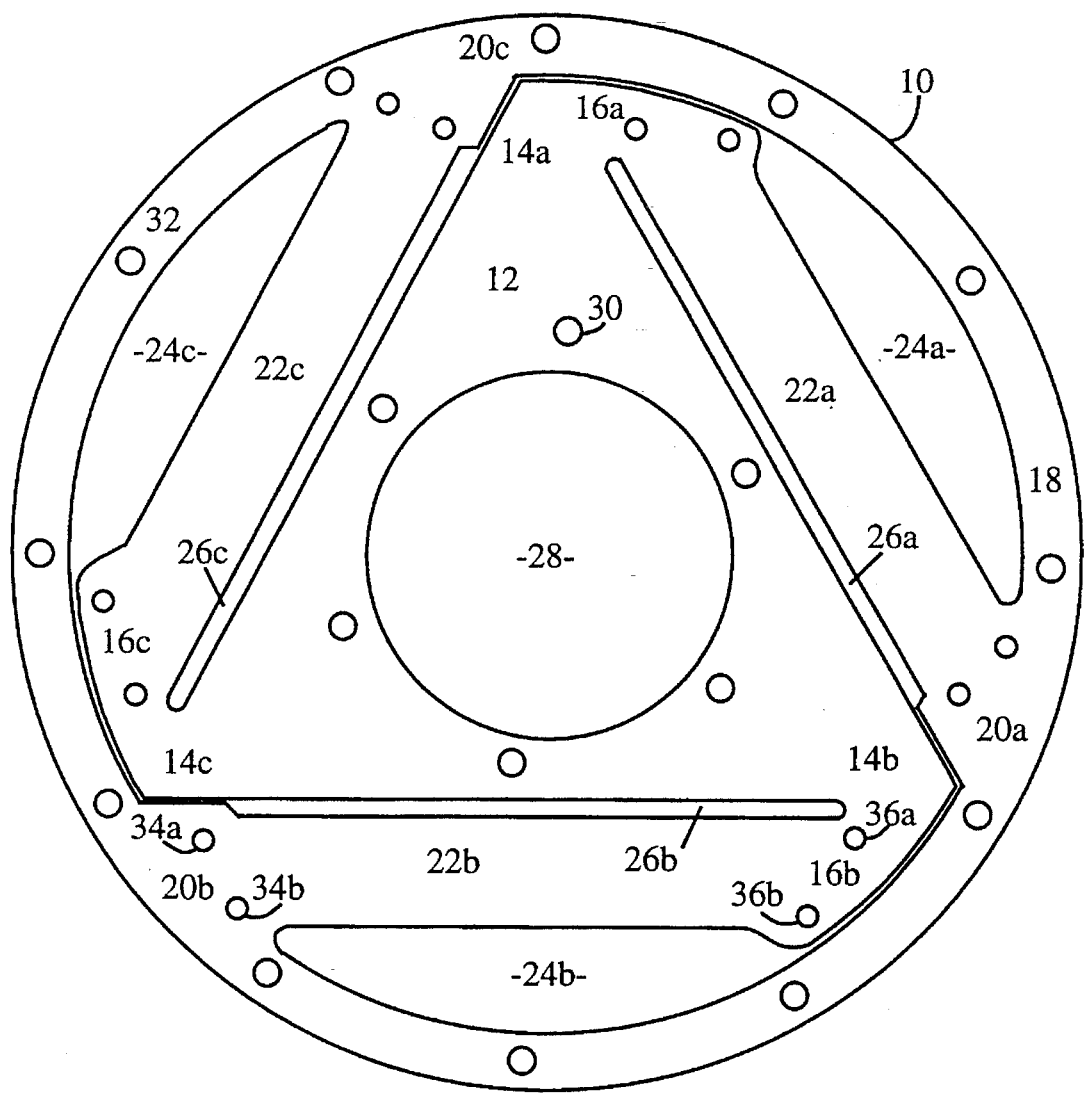
FIG. 1 shows a cut diaphragm of the improved tangential linear flexure bearing.

Referring to FIG. 1, a cut diaphragm 10 is used with a reciprocating device, the such as cryocooler (not shown). The cut diaphragm 10 is part of a tangential three leg delta linear flexure bearing shown in FIG. 3. The flexure bearing 10 may be preferably made of sheet stainless steel stock. The cut diaphragm 10 shown having a spider delta hub portion 12 is preferably in the shape of an equilateral triangle having three delta hub extension portions 14a, 14band 14c. Other configurations of the delta hub 12 may be used, for example, and a spoked configuration having three radially extending substantially rectangular fingers. Each of the extension portions 14a, 14band 14chave respective spider hub arms 16a, 16b and 16c. The diaphragm 10 also has a spider rim 18 which is circular and extends circumferentially about the entire diaphragm 10. The outer diameter of the rim 18 is preferably between one and six inches. The rim 18 has three spider rim arms 20a, 20b and 20c. Flexure blades 22a, 22b and 22c extend between hub arms 16a, 16b and 16c, and rim arms 20a, 20b and 20c , respectively. The rim 18 and flexures 22a, 22b and 22c define spider rim breathing apertures 24a, 24b and 24c, respectively. The hub 12 and flexures 22a, 22b and 22c define hub breathing apertures 26a, 26b and 26c, respectively. Thus, the cut diaphragm 10 comprises a delta hub 12, flexures 22 and a rim 18, with arms 16 and 20 connecting the flexures 22 between the hub and rim, respectively.

The delta hub 12 has a hub utility hole 28 for receiving a reciprocating drive shaft, not shown, of, for example, a cryocooler, or like reciprocating device requiring a high reliability flexure bearing. Utility hole 28 is located at the center of delta hub 12 of diaphragm 10 for use in conjunction with the drive shaft, or a wiring harness (not shown). The hub 12 also includes a plurality of alignment holes 30, only one of which is designated as such, for fastening to and alignment with the drive shaft. The rim 18 has a plurality of fastening and alignment holes 32, only one of which is designated as such, for fastening to and alignment with a housing, not shown, of the exemplar cryocooler. Fastener and alignment holes 32 are located around the delta hub 12 and rim 18. Each of the rim arms 20 have a pair of rivet points 34a and 34b, only one pair of which is designated as such, and each hub arms 16 also has a pair of rivet points 36a and 36b, only one pair of which is designated as such. In addition to bracing materials, not shown, rivet holes 34 and 36 located near the flexure blades 22 are provided to secure the flexure diaphragm 10 and are used for shear stress control.

Figure 2:
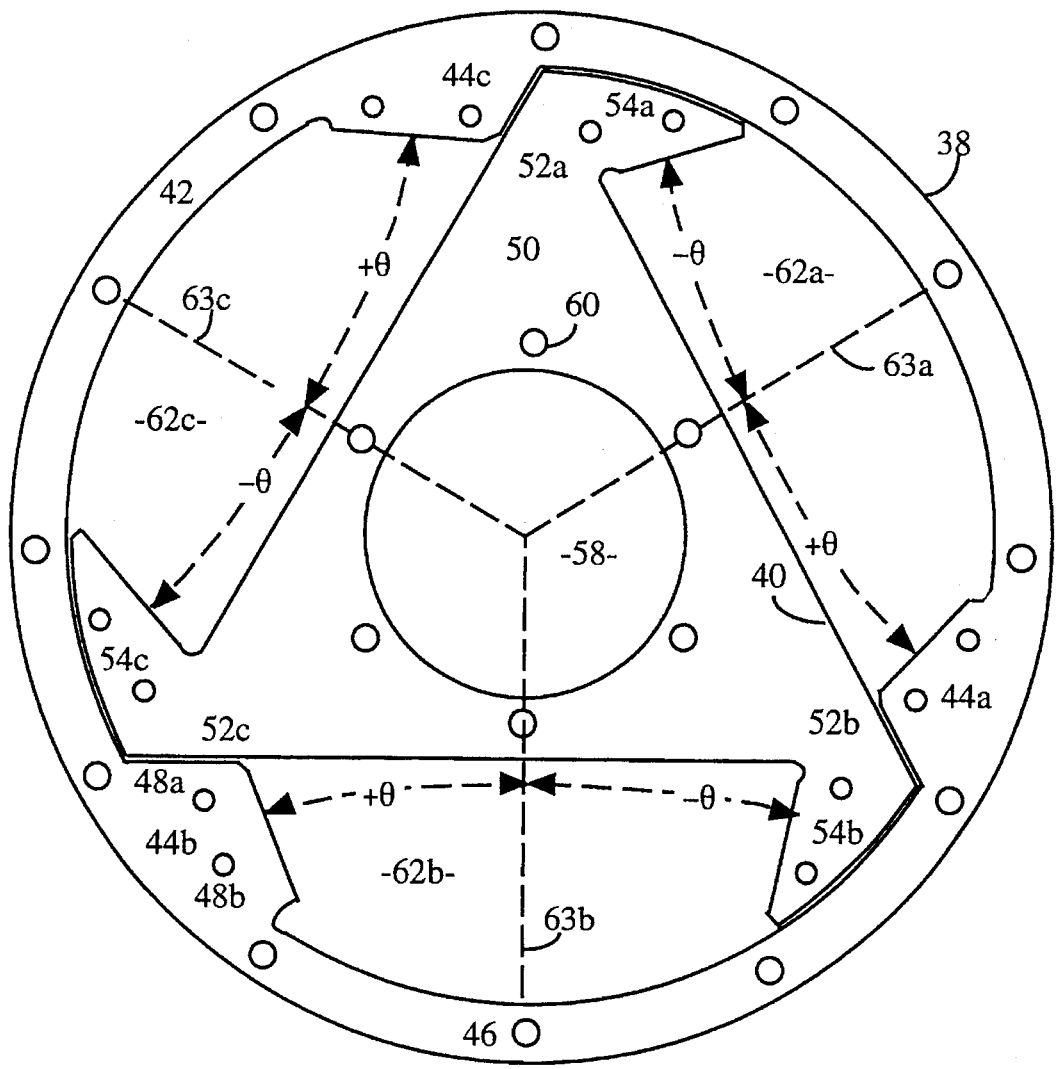
FIG. 2 shows a rim and a spacer of the improved tangential linear flexure bearing.

Referring to FIG. 2, a rim spacer 38 and a hub spacer 40 are used together as a spacer pair. Rim spacer 38 also includes a rim spacer rim 42 and rim spacers arms 44a, 44b and 44c. The rim spacer 38 also has rim spacer fastening and alignment holes 46, only one of which is designated as such.

The rim spacer arms 44a, 44b and 44c each have a respective pair of rim spacer rivet holes 48a and 48b, only one pair of which is designated as such. The hub spacer 40 has a hub spacer delta hub 50 having three hub spacer delta hub extension portions 52a, 52b and 52c, each of having a respective hub spacer arm, 54a, 54b and 54c. Each of the hub arms 54 have pair of rivets points 56a and 56b, only one pair of which is designated as such. The hub spacer 40 also has a hub spacer utility hole 58 and a plurality of hub spacer fastener and alignment holes 60, only one of which is designated as such. The holes 60 are circumferentially and equiangularly disposed around the hole 58 centered in the delta hub 50.

The hub spacer 40 is positioned within the rim spacer 38 as shown creating flexure spaces 62a, 62b and 62c. Each of flexure spaces 62 is respectively defined by a straight tangential side of the equiangular delta hub 50, a circular circumferential side of the rim spacer 58, a positive theta angle side of a rim arm 44, and a negative theta angle side of a hub arm 54. The positive and negative theta angles being defined by radial lines extending from the center of hole 58 and respective side of the arm 44 and 54.

The positive and negative angles theta are equal to the angular displacement between the edge of rim arms 44 or the edge of hub arms, 54 respectively, and a line 63 radially extending from the center of aperture 58. The positive and negative angles theta are thus equal to the angular displacement between the edge of the rim arms 44 or the edge of hub arms 54 and the line 63 which is orthogonal relative to straight edges of hub 50 defining apertures 62.

Figure 3:
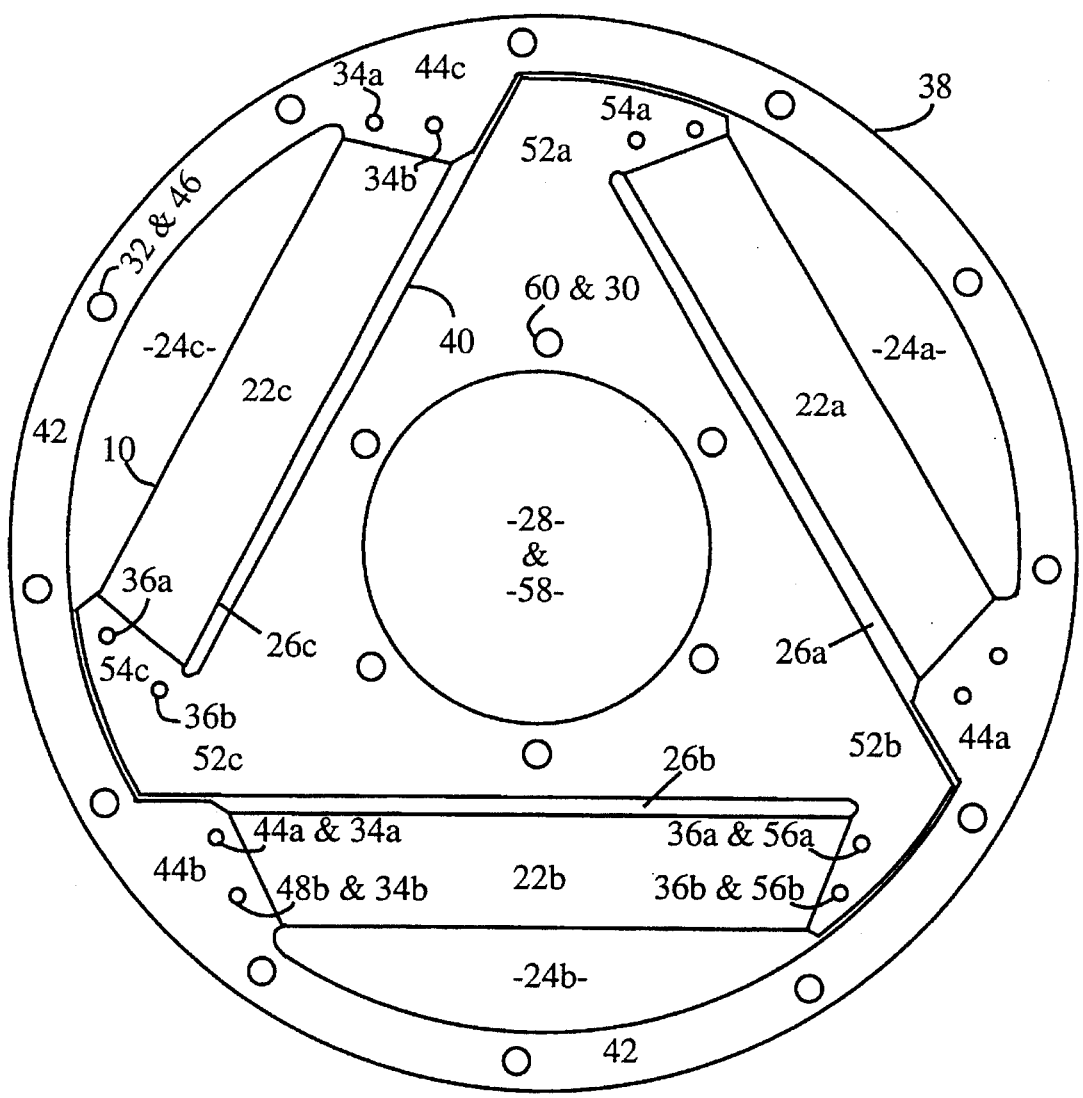
FIG. 3 shows an assembled improved tangential linear flexure bearing having the rim spacer, the hub spacer and the improved tangential linear flexure diaphragm.

Referring to FIGS. 1, 2 and 3, an assembled flexure bearing is shown in FIG. 3. The cut flexure diaphragm 10 is a circumferential tangent cantilever diaphragm which is sandwiched, braced or fastened between two sets, a front set and a back set, each consisting of an inner hub spacers 40 and outer rim spacers 38. The thickness of hub spacer 40 and rim spacer 38 is generally thicker than diaphragm 10. The circumferential tangential cantilever diaphragm 10 consists of two or more flexure blades 22, and preferably three flexure blades as shown. The assembled flexure bearing has five parts including two rim spacers 38, two hub spacer 40, and one cut flexure diaphragm 10. The assembled flexure bearing includes a center cut flexure diaphragm 10, only the flexure blades 22 being exposed in FIG. 3. The remainder of the diaphragm 10 being covered as disposed between the pairs of rim spacers 38 and hub spacers 40, only one of such pairs being shown in FIG. 3. The rim spacers 38 and hub spacers 40 are positioned on the diaphragm 10 such that: the holes 32 and 46, holes 28 and 58, holes 60 and 30, rivets 48 and 34, rivets 36 and 56 are aligned together. As such, the flexures 22 extend tangentially between respective rim arm 44 and hub arms 54, which are respectively align with cut diaphragm rim arm 20 and hub arms 16.

During reciprocating operation of the flexure bearing, the rim 38 is rigidly attached to a housing. The reciprocating hub spacer 40 is positioned relative to the rim 38. The rim spacer 38 and hub spacer 40, and the corresponding aligned portions 12, 14, 16, 18, 20 of the diaphragm remain flat and parallel to each during reciprocating movement, while only the flexure blades 22 bend to enable the hub spacer 40 to move orthogonally relative to the rim 38 during reciprocating operation. In particular, the motion of the center of the hub spacer 40 moves in a straight line perpendicular to the plane of the rim spacer 38 and hub spacer 40. The flexure blades 22 are flat and parallel with the rim spacer 38 and hub spacer 40 at a mid stroke position, and bend into the shape of an "S" and an inverted "S" at the forward and rearward stroke positions, respectively. Thus, the hub spacer 40 and corresponding rigidly attached diaphragm portions 12, 14 and 16 reciprocate while the rim spacer 38 and the corresponding rigidly attached diaphragm portion 18 and 20 remained in a fixed position relative to the hub spacer 40.

The positive angle theta of proximal ends of the flexures 22 at the edge of rim arms 44, and the negative angle theta of distal ends of the flexures 22 at the edge of hub arms 54 define the flexures 22 in the shape of trapezoids having two parallel sides defining aperture 26 and 24, and two unparallel sides defined by the edges of the rim arms 44 and hub arms 54.

The positive and negative angle of the arms 44 and 54 provided increased stiffness to the flexure blades 20 tending to distribute reciprocating stress along the length and width of the flexures blades 20. The theta angle is preferably twenty-seven ±ten degrees, in the preferred case of a three leg cut flexure diaphragm 10.

The rim spacer 38 and hub spacer 40 are used to direct reciprocating forces upon the flexure blades 22 and provide spaces between multiple flexure diaphragms of respective flexure bearings which do not touch each other during operation. A plurality of aligned flexure bearings, for example, ten, are positioned within a single housing and upon the drive shaft of a cryocooler, and reciprocate in tandem for increased stiffness and performance.

The tangential linear flexure bearing design with theta angles of arms 44 and 54 support the flexure blades 22 increase the stiffness of flexure bearing. For a given outside diameter of the rim spacer 38, a given gage thickness of the sheet metal, and a given stroke displacement, the symmetrical design of the theta angles increases the radial stiffness per maximum stress, that is, the greatest stiffness at the lowest cyclic stress for improved reliability. The invention can be used in reciprocating machines such as spacecraft borne cryocoolers to provide long life, frictionless, non-wearing linear movement and radial support.

A symmetrical tangential flexure blades 22 are defined in part by the arm 44 and 54 to distribute the stress more evenly over the flexure thereby reducing the maximum stress at any given point. The positive and negative theta angles, which are equal and opposite, that is, symmetrical, of the arms 44 and 54 reduces maximum stress points along the flexures blades 22.

Figure 4:
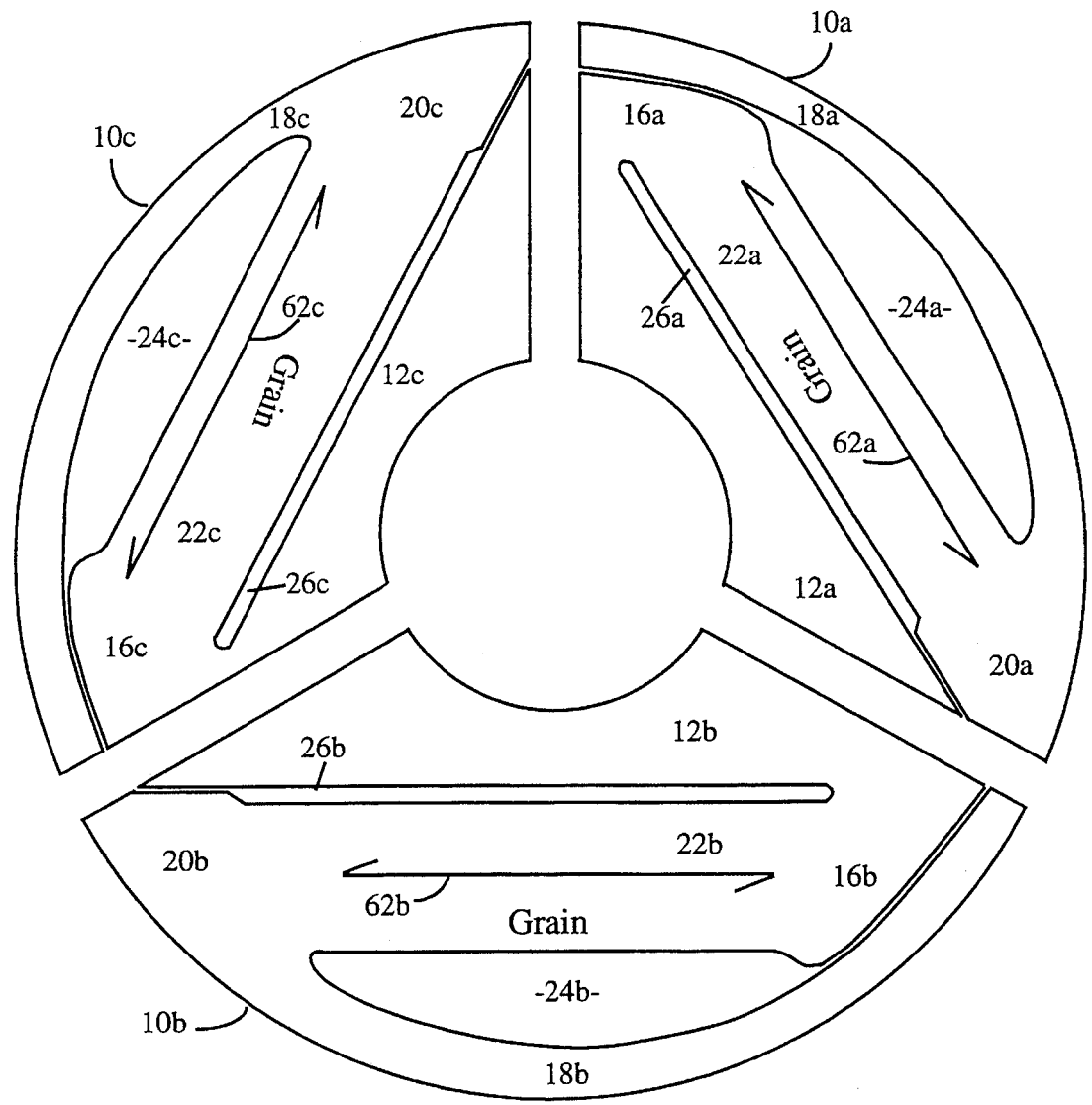
FIG. 4 shows a segmented diaphragm of the improved tangential linear flexure bearing having three flexure components each of which have a respective flexure blade with a predetermined grain orientation extending along the length of the flexure blade.

Referring to all the Figures and particularly to FIG. 4, the cut flexure diaphragm 10 of FIG. 1 can be divided into three flexure components 10a, 10b and 10c. The flexure components 10a, 10b and 10c are shown without rivet points nor fastening and alignment holes, which are preferably included. The flexure components 10a, 10b and 10c are secured together between the rim spacers 38 and hub spacer 40 in the same manner as is the integral diaphragm 10 of FIG. 1. The cut flexure diaphragm 10 is radially split along the length and in the middle of the extension portion 14a, 14b 14c such that the delta hub 12 is split into three equal parts, 12a, 12b and 12c, and the rim 18 is likewise split into three equal parts 18a, 18b and 18c. Thus, each flexure component 10a, 10b and 10c are identical to each other.

The cut flexure diaphragm 10 can be made of three individual but identical flexure components 10a, 10b and 10c. Rolled flexure components 10a, 10b and 10c of sheet stock have grain orientation. By have having three identical flexures cut as shown, each can be made to have the grain orientation extending along the flexure length. Each of the flexure components 10a, 10b and 10c can be individual manufactured so that each respective flexure blade 22a, 22b and 22c have a grain cut orientation 62a, 62b and 62c that runs along the length of the flexure blades 22a, 22b and 22c. Such a grain orientation increases the maximum allowable material stress when subjected to repeated flexure bending The present invention provides for symmetrical arm angles at the ends of the flexure blades 22 and grain orientations 62 along the length of the flexure blades 22e, 22b and 22c. The arm theta angles centered flexures 22a, 22b and 22c relative radially extending lines 63a, 63b and 63c, respectively reduce maximum stress points along the length and width of the flexure blades 22 and the grain orientations 62 increase the fatigue strength of the flexure material. While those skilled in the art may make further improvement and modification to the tangential linear flexure bearing, those improvements and modifications may nonetheless fall within the spirit and scope of the following claims.

What is claimed is:

1. A tangential linear flexure bearing having a diaphragm, and at least one rim spacer and at least one hub spacer, said diaphragm having a hub with a predetermined number of equiangularly disposed radially extending hub extensions each having a distal end, having a same predetermined number of respective hub arms extending tangentially from said distal ends of said hub extensions, having a same predetermined number of tangentially disposed flexure blades each having a uniform width along a length, and having a circular rim having a same predetermined number of rim arms equiangular disposed about said rim and extending tangentially from said circular rim, said flexure blades have distal ends tangentially extending from respective rim arms and have proximal ends respectively tangentially extending from said hub arms, said rim spacer identical in shape to said circular rim, said hub spacer identical in shape to said hub, said rim spacer and hub spacer being rigidly attached to said diaphragm in alignment of to said hub and said rim, wherein the improvement comprises, said proximal ends of said flexure blades as defined by said respective hub arms forms a negative angle from respective radial lines radially extending from a center point of said diaphragm and orthogonal to said length of said flexure blades, said distal ends of said flexure blades as defined by said respective rim arms forms a positive angle from said respective radial lines, said negative angle and said positive angle being equal but opposite to each other, and said distal ends and said proximal ends equally displaced and centered from said respective radial lines and defining a trapezoidal shape of said flexure blades.

2. The tangential linear flexure bearing of claim 1 wherein said predetermined number is three.

3. The tangential linear flexure bearing of claim 1 wherein said positive angle and said negative angle is 27 degrees, plus or minus ten degrees.

4. The tangential linear flexure bearing of claim 1 wherein said hub arms and rim arms have rivet points for securing said hub arms and said rims to respective ones of said flexure blades.

5. The tangential linear flexure bearing of claim 1 wherein said hub is shaped as an equilateral triangle.

6. A tangential linear flexure bearing having a diaphragm, and at least one rim spacer and at least one hub spacer, said diaphragm having a hub with a predetermined number of equiangularly disposed radially extending hub extensions each having at a distal end, having a same predetermined number of respective hub arms extending tangentially from said distal ends of said hub extensions, having a same predetermined number of tangentially disposed flexure blades, and having a circular rim having a same predetermined number of rim arms equiangular disposed about said rim and extending tangentially from said circular rim, said flexure blades distal ends tangentially extending from respective rim arms and have proximal ends respectively tangentially extending from said hub arms, said rim spacer identical in shape to said circular rim, said hub spacer identical in shape to said hub, said rim spacer and hub spacer being rigidly attached to said diaphragm in alignment to said hub and said rim, wherein the improvement comprises, said diaphragm consisting of identical flexure components each of which having one of said flexure blades, said flexure blades each having grain orientation extending tangentially along a length of said flexure blades between said proximal ends and said distal ends of each of said flexure blades.

7. The tangential linear flexure bearing of claim 6 wherein the improvement further comprises said proximal ends of said flexure blades as defined by said respective hub arms is a negative angle from radial lines radially extending from a center point of diaphragm, said distal ends of said flexure blades as defined by said respective rim arms is a positive angle from other radial lines radially extending from said center point of said diaphragm, said negative angle and said positive angle being equal but opposite to each other.

8. The tangential linear flexure bearing of claim 7 wherein said flexure components being joined along radial lines extending from said center point through said equiangularly disposed radially extending hub extensions.

9. The tangential linear flexure bearing of claim 7 wherein said predetermined number is three.

10. The tangential linear flexure bearing of claim 7 wherein said positive angle and said negative angle is 27 degrees.

11. The tangential linear flexure bearing of claim 7 wherein said hub arms and rim arms have rivet points for securing said hub arms and said rim arms to respective ones of said flexure blades.

12. The tangential linear flexure bearing of claim 7 wherein said hub is shaped as an equilateral triangle.

* * * * *